(12) United States Patent
Nishino et al.

(10) Patent No.: US 12,442,954 B2
(45) Date of Patent: Oct. 14, 2025

(54) OPTICAL SHEET AND OPTICAL COMPONENT

(71) Applicant: SUMITOMO BAKELITE CO., LTD., Tokyo (JP)

(72) Inventors: Satoshi Nishino, Tokyo (JP); Hiroshi Oya, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 585 days.

(21) Appl. No.: 17/772,713

(22) PCT Filed: Oct. 26, 2020

(86) PCT No.: PCT/JP2020/040039
§ 371 (c)(1),
(2) Date: Apr. 28, 2022

(87) PCT Pub. No.: WO2021/085357
PCT Pub. Date: May 6, 2021

(65) Prior Publication Data
US 2023/0011467 A1 Jan. 12, 2023

(30) Foreign Application Priority Data
Oct. 29, 2019 (JP) .................. 2019-196802

(51) Int. Cl.
*G02B 1/04* (2006.01)
*C09B 29/33* (2006.01)
(Continued)

(52) U.S. Cl.
CPC ............... *G02B 1/04* (2013.01); *C09B 29/33* (2013.01); *C09B 33/02* (2013.01); *G02B 1/08* (2013.01);
(Continued)

(58) Field of Classification Search
CPC . G02B 1/04; G02B 1/041; G02B 1/08; G02B 1/10; G02B 1/14; G02B 5/30;
(Continued)

(56) References Cited

U.S. PATENT DOCUMENTS

2004/0261662 A1 12/2004 Grandidier et al.
2007/0076166 A1 4/2007 Kobuchi et al.
(Continued)

FOREIGN PATENT DOCUMENTS

JP 2007-93927 A 4/2007
JP 2008-66964 A 3/2008
(Continued)

OTHER PUBLICATIONS

"ISO 11664-4:2008 Colorimetry—Part 4: CIE 1976 L*a*b* Colour space", International Standard—ISO, Zuerich, CH, Nov. 1, 2007, vol. 11664-4, No. 1st ed, pp. 1-17, XP009125830, cited in EP Office Action dated Sep. 29, 2023. (17 pages).
(Continued)

*Primary Examiner* — Ricky D Shafer
(74) *Attorney, Agent, or Firm* — WHDA, LLP (57) ABSTRACT

An optical sheet 10 of the present invention includes a laminate including a polarizing layer 4 containing at least one kind of a light absorbing agent and having a polarizing function, and a protective layer 1 laminated on the polarizing layer 4, in which in the polarizing layer 4, a value of a* is 0 or more and 30 or less and a value of b* is 0 or more and 30 or less in an L*a*b* color system defined by JIS Z 8781-4, and in the optical sheet 10, a size of a Q Blue value defined by Australian Standard Australia/New Zealand Standard 1067-2016 is 0.70 or more. Thus, even when the optical sheet is toned to brown, blue light can be distinguished with excellent distinguishability.

7 Claims, 3 Drawing Sheets

(51) Int. Cl.
*C09B 33/02* (2006.01)
*G02B 1/08* (2006.01)
*G02C 7/10* (2006.01)
*G02C 7/12* (2006.01)
*B29D 11/00* (2006.01)
*B29K 23/00* (2006.01)
*B29K 105/00* (2006.01)

(52) U.S. Cl.
CPC ............... *G02C 7/10* (2013.01); *G02C 7/12* (2013.01); *B29D 11/00644* (2013.01); *B29D 11/0073* (2013.01); *B29K 2023/086* (2013.01); *B29K 2105/0032* (2013.01)

(58) Field of Classification Search
CPC .... G02B 5/3025; G02B 5/3033; C09B 33/02; C02C 7/10; C02C 7/12; B29D 11/00644; B29D 11/0073; B29K 2023/086
USPC ....... 359/487.01, 487.02, 488.01; 351/44, 49
See application file for complete search history.

(56) References Cited

U.S. PATENT DOCUMENTS

| | | | |
|---|---|---|---|
| 2008/0055042 A1 | 3/2008 | Okada et al. | |
| 2013/0141693 A1 | 6/2013 | McCabe et al. | |
| 2014/0375945 A1* | 12/2014 | Tokumaru | B29D 11/00009 351/49 |
| 2015/0234210 A1 | 8/2015 | Kimura et al. | |
| 2015/0355395 A1 | 12/2015 | Kimura et al. | |
| 2018/0299598 A1 | 10/2018 | Kim et al. | |
| 2019/0033620 A1* | 1/2019 | Yahagi | G02B 5/3016 |
| 2019/0187489 A1 | 6/2019 | Valentine | |
| 2023/0054103 A1* | 2/2023 | McCabe | G02C 7/108 |

FOREIGN PATENT DOCUMENTS

| | | |
|---|---|---|
| JP | 2012-173704 A | 9/2012 |
| JP | 2013-011840 A | 1/2013 |
| JP | 2018-66964 A | 4/2018 |
| JP | 2018-514817 A | 6/2018 |
| JP | 2019-185068 A | 10/2019 |
| WO | 2014/030611 A1 | 2/2014 |
| WO | 2014/115705 A1 | 7/2014 |
| WO | 2019/113357 A1 | 6/2019 |

OTHER PUBLICATIONS

Anon: "Standard illuminant", Wikipedia, Sep. 25, 2023, XP093085537, Retrieved from the Internet: URL:https://en.wikipedia.org/wiki/Standard_illuminant [retrieved on Sep. 25, 2023], cited in EP Office Action dated Sep. 29, 2023. (9 pages).

International Search Report dated Nov. 24, 2020, issued in counterpart International Application No. PCT/JP2020/040039 (3 pages).

Australian/New Zealand Standard; Eye and face protection-Sunglasses and fashion spectacles Part 1: Requirements; No. 1067.1:2016. [Standards Australia Limited/Standards New Zealand]. Sep. 30, 2016. p. 8, paragraph 5.3.2.3. (36 pages) cited in EESR dated Nov. 28, 2022.

Rizzi, V. et al.; Polyamidoamine-based hydrogel for removal of blue and red dyes from wastewater, Advanced Sustainable Systems. vol. 2, Issue. 6, [WILEY-VCH Verlag]. Apr. 20, 2018. p. 1700146. ISSN 2366-7486. (13 pages) cited in EESR dated Nov. 28, 2022.

Notice of Reasons for Revocation dated Mar. 17, 2023, issued in counterpart JP Application 2021-097242, with English translation. (10 pages).

* cited by examiner

OPTICAL SHEET AND OPTICAL COMPONENT

TECHNICAL FIELD

The present invention relates to an optical sheet and an optical component.

BACKGROUND ART

For example, an optical sheet having a polarizing function for the purpose of increasing contrast of the visual field, antiglare, and the like is known (refer to, for example, PTL 1). This optical sheet is used by being attached to eyeglasses, sunglasses, sun visors, and the like.

The optical sheet disclosed in PTL 1 is manufactured by stretching, in one direction, a layer containing a resin material and a dye (light absorbing agent) dispersed in the resin material, for example.

As such an optical sheet, there are optical sheets of which the color is toned to brown that is a standard color for sunglasses and the like, but in this case, generally, there is a problem of a deterioration in distinguishability of blue light.

CITATION LIST

Patent Literature

[PTL 1] WO2014/115705

SUMMARY OF INVENTION

Technical Problem

An object of the present invention is to provide an optical sheet capable of visually recognizing blue light with excellent distinguishability even when the optical sheet is toned to brown, and an optical component having such an optical sheet.

Solution to Problem

Such an object is achieved by the present invention described in the following (1) to (7).

(1) An optical sheet including a laminate including a polarizing layer containing at least one kind of a light absorbing agent and having a polarizing function, and a protective layer laminated on the polarizing layer, in which in the polarizing layer, a value of a* is 0 or more and 30 or less and a value of b* is 0 or more and 30 or less in an L*a*b* color system defined by JIS Z 8781-4, and in the optical sheet, a size of a Q Blue value defined by Australian Standard Australia/New Zealand Standard 1067-2016 is 0.70 or more.

(2) The optical sheet according to (1), in which the polarizing layer has a first peak having a peak wavelength of light transmittance in a wavelength range of 460 nm or more and 510 nm or less in a light absorption spectrum, and in which the light transmittance at the peak wavelength of the first peak is 5% or more and 40% or less.

(3) The optical sheet according to (2), in which a half-width of the transmittance at the first peak is 20 nm or more and 60 nm or less.

(4) The optical sheet according to any one of (1) to (3), in which the light absorbing agent includes a first light absorbing agent having a peak light absorbance in a wavelength range of 580 nm or more and 680 nm or less, a second light absorbing agent having a peak light absorbance in a wavelength range of 380 nm or more and 430 nm or less, and a third light absorbing agent having a peak light absorbance in a wavelength range of 430 nm or more and 580 nm or less, and in which when a transparent film is dyed with the second light absorbing agent such that transmittance of a peak top is 30% and transmittance from 680 nm to 780 nm is 90% or more, the second light absorbing agent has a light absorption spectrum in which an average light transmittance obtained as an average value of transmittance measured in a wavelength range of 480 nm or more and 530 nm or less is 67% or more and 99% or less.

(5) The optical sheet according to (4), in which each of the first light absorbing agent, the second light absorbing agent, and the third light absorbing agent is an azo-based dye.

(6) The optical sheet according to (4) or (5), in which the second light absorbing agent is at least one of yellow dyes represented by General Formula (1) and General Formula (2).

(1)

Where $R^1$'s each independently represent a hydrogen atom, a methyl group, or a sodium sulfonate group.

(2)

Where $R^2$'s each independently represent a hydrogen atom, a methyl group, or a sodium sulfonate group.

(7) An optical component including:
a substrate; and
the optical sheet according to any one of (1) to (6) which is laminated on the substrate.

Advantageous Effects of Invention

According to the present invention, in the optical sheet toned to brown, even blue light can be visually recognized with excellent distinguishability.

DESCRIPTION OF EMBODIMENTS

Hereinafter, an optical sheet and an optical component of the present invention will be described in detail based on preferred embodiments shown in the accompanying drawings.

An optical sheet 10 of the present invention includes a laminate including a polarizing layer 4 containing at least one kind of a light absorbing agent and having a polarizing function, and a protective layer 1 laminated on the polarizing layer 4, in which in the polarizing layer 4, a value of a* is 0 or more and 30 or less and a value of b* is 0 or more and 30 or less in an L*a*b* color system defined by JIS Z 3781-4, and in which in the optical sheet 10, a size of a Q Blue value defined by Australian Standard Australia/New Zealand Standard 1067-2016 is 0.70 or more.

As described above, in the polarizing layer 4, the value of a* is 0 or more and 30 or less and the value of b* is 0 or more and 30 or less in the L*a*b* color system. Therefore, the optical sheet 10 can be an optical sheet toned to brown. In addition, such an optical sheet 10 of the present invention, a size of a Q Blue value defined by Australian Standard Australia/New Zealand Standard 1067-2016 is 0.70 or more. Accordingly, even when the optical sheet 10 is toned to brown, blue light can be visually recognized with excellent distinguishability.

Figure 1:
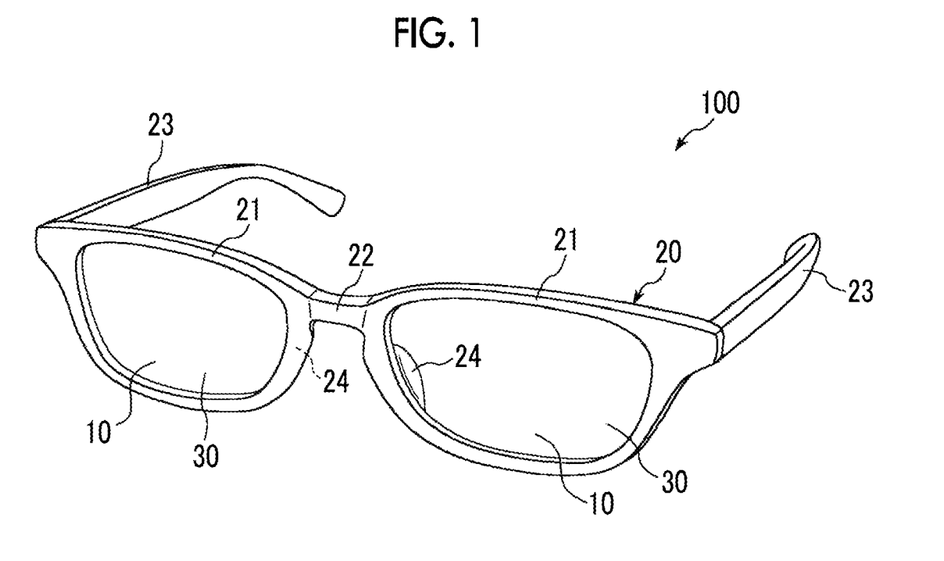
FIG. 1 is a perspective view of sunglasses as an optical component and shows a state in which an optical sheet of the present invention is attached.

The optical sheet 10 of the present invention is used by being attached to a spectacle lens 30 included in sunglasses 100 as an optical member, for example. Therefore, in the following description, prior to describing the optical sheet 10 of the present invention, the sunglasses 100 as an optical component showing a state in which the optical sheet 10 of the present invention is attached will be described first.
<Sunglasses>
FIG. 1 is a perspective view of the sunglasses as an optical component and shows a state in which the optical sheet of the present invention is attached. In FIG. 1, when the sunglasses are worn on a head portion of a user, a surface on an eye-side of the user of the lens is referred to as a back side surface, and a surface on an opposite side thereof is referred to as a front side surface.

As shown in FIG. 1, the sunglasses 100 includes a frame 20, spectacle lenses 30, and the optical sheets 10.

In the present specification, the term "spectacle lens" includes both one having a light-collecting function and one not having the light-collecting function.

The frame 20 is worn on the head portion of the user so that the spectacle lens 30 is disposed in the vicinity of the front of eyes of the user.

The frame 20 has rim portions 21, a bridge portion 22, temple portions 23, and nose pad portions 24.

The rim portion 21 has a ring shape, and one rim portion is provided for each of the right eye and the left eye to correspond thereto, and the spectacle lens 30 is installed inside. Thus, the user can visually recognize external information through the spectacle lenses 30.

In addition, the bridge portion 22 has a rod shape, and is located in front of an upper part of a nose of the user when worn on the head portion of the user to connect the pair of the rim portions 21.

The temple portion 23 has a bow shape, and is connected to an edge portion on a side opposite to a location of each of the rim portions 21 to which the bridge portion 22 is connected. This temple portion 23 is hung on an ear of the user when worn on the head portion of the user.

The nose pad portion 24 is provided on an edge portion of each of the rim portions 21 corresponding to the nose of the user when the sunglasses 100 are worn on the head portion of the user, abuts the nose of the user, and has a shape corresponding to an abutting portion of the nose. Thus, the worn state can be stably maintained.

The constituent material of each part constituting the frame 20 is not particularly limited, and various metal materials, various resin materials, and the like can be used, for example. The shape of the frame 20 is not limited to the one shown in the drawing as long as it can be worn on the head portion of the user.

Each of the spectacle lenses 30 is installed to each of the rim portions 21. This spectacle lens 30 is a member having a light-transmitting property and forming a plate shape curved toward the outside.

The constituent material of the spectacle lens 30 is not particularly limited as long as it has the light-transmitting property, but examples thereof include various resin materials such as various curable resins such as various thermoplastic resins, thermosetting resins, and photocurable resins, various glass materials, various crystal materials, and the like, and one or two or more kinds thereof can be used in combination.

Examples of the resin material include polyolefins such as polyethylene, polypropylene, and an ethylene-propylene copolymer, polyvinyl chloride, polystyrene, polyamides, polyimides, polycarbonate, poly-(4-methylpentene-1), ionomer, acrylic resin, polymethyl methacrylate, an acrylonitrile-butadiene-styrene copolymer (ABS resin), an acrylonitrile-styrene copolymer (AS resin), a butadiene-styrene copolymer, polyesters such as polyethylene terephthalate (PET) and polybutylene terephthalate (PBT), polyether, polyetherketone (PEK), polyetheretherketone (PEEK), polyetherimide, polyacetal (POM), polyphenylene oxide, polysulfone, polyethersulfon, polyphenylene sulfide, polyarylate, aromatic polyester (liquid crystal polymer), polytetrafluoroethylene, polyvinylidene fluoride, other fluororesins, epoxy resins, phenolic resins, urea resins, melamine resins, silicone resins, polyurethanes, and the like, or copolymers, blends, polymer alloys, and the like mainly containing these, and one or two or more kinds thereof can be used in combination.

In addition, examples of the glass material include soda glass, crystalline glass, quartz glass, lead glass, potassium glass, borosilicate glass, and non-alkali glass, and one or two or more kinds thereof can be used in combination.

In addition, examples of the crystal material include sapphire, quartz, and the like, and one or two or more kinds thereof can be used in combination.

The thickness of the spectacle lens 30 is not particularly limited, and is preferably 0.5 mm or more and 5.0 mm or less, and more preferably 10 mm or more and 3.0 mm or less, for example. Thus, compatibility between relatively high strength and weight reduction is possible.

In the present embodiment, the optical sheet 10 is attached to an outer side surface of the spectacle lens 30, that is, to a curved convex surface while forming a curved shape corresponding to such a shape, thereby making the sunglasses 100 decorative. In addition, light in a predetermined wavelength range is selectively reflected and transmitted, which tones the optical sheet 10 to brown in the present embodiment, and thereby the sunglasses 100 exerts functions as sunglasses.

In such sunglasses 100, the optical sheet 10 is constituted of the optical sheet of the present invention. Hereinafter, the optical sheet 10, that is, the optical sheet of the present invention will be described.

<Optical Sheet>

Figure 2:
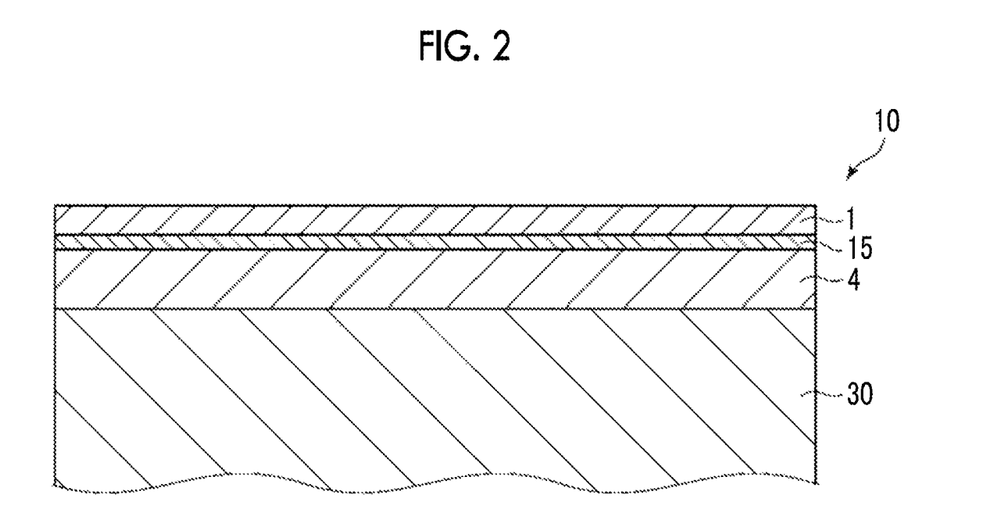
FIG. 2 is a partially enlarged vertical cross-sectional view showing an embodiment of the optical sheet of the present invention.
Figure 3:
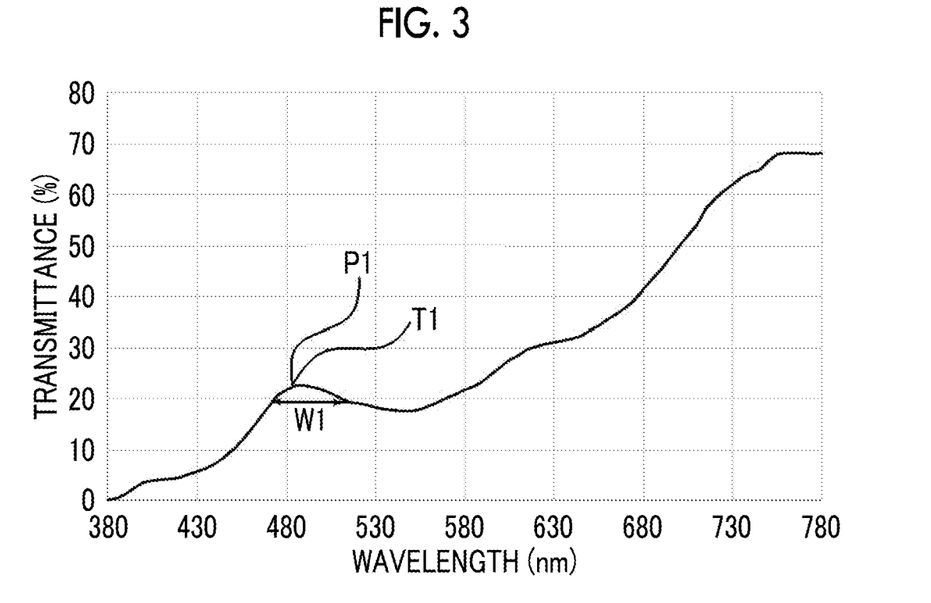
FIG. 3 is a graph showing a light absorption spectrum of a polarizing layer included in the optical sheet shown in FIG. 2.
Figure 4:
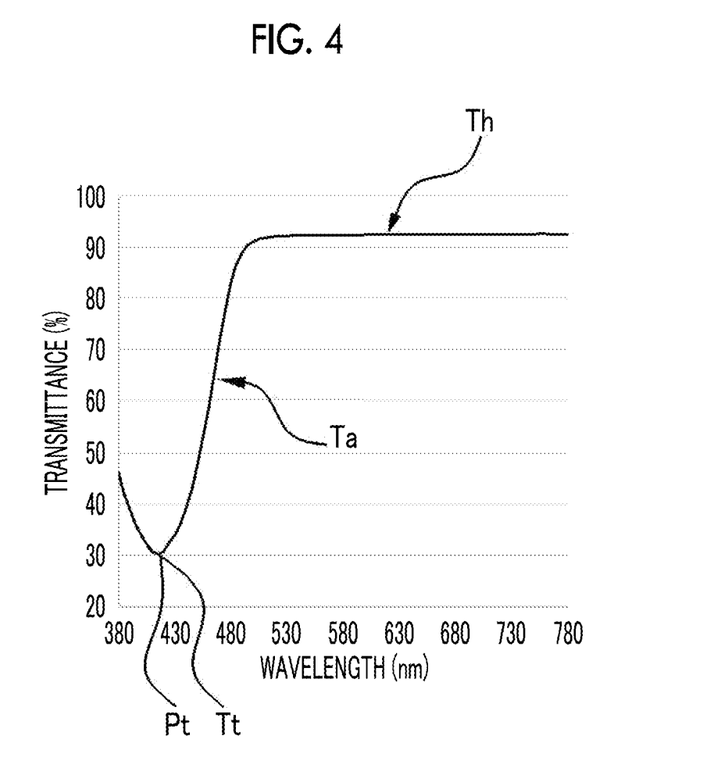
FIG. 4 is a graph showing a light absorption spectrum of a second light absorbing agent contained in a polarizing layer 4 included in the optical sheet shown in FIG. 2.

FIG. 2 is a partially enlarged vertical cross-sectional view showing the embodiment of the optical sheet of the present invention, FIG. 3 is a graph showing a light absorption spectrum of a polarizing layer included in the optical sheet shown in FIG. 2, and FIG. 4 is a graph showing a light absorption spectrum of a second light absorbing agent contained in a polarizing layer 4 included in the optical sheet shown in FIG. 2.

In FIG. 2, the upper side is referred to as "upward" or "upper", and the lower side is also referred to as "downward" or "lower". In addition, in the drawings referred to in the present specification, the dimensions in the thickness direction are exaggerated and shown and are significantly different from the actual dimensions.

As shown in FIG. 2, the optical sheet 10 has a protective layer 1, an adhesive layer 15, and a polarizing layer 4, and these are laminated in this order. That is, the polarizing layer 4 and the protective layer 1 are bonded via the adhesive layer 15. In addition, in the present embodiment, the polarizing layer 4 is bonded to the spectacle lens 30 so as to be located on the spectacle lens 30 side.

In the optical sheet 10 having such a constitution, in the present invention, in the polarizing layer 4, a value of a* is 0 or more and 30 or less and a value of b* is 0 or more and 30 or less in an L*a*b* color system defined by JIS Z 8781-4, and in the optical sheet 10, a size of a Q Blue value defined by Australian Standard Australia/New Zealand Standard 1067-2016 is 0.70 or more. Accordingly, even in the optical sheet 10 toned to brown, blue light can be visually recognized with excellent distinguishability.

Hereinafter, each layer constituting the optical sheet 10 will be described.

(Polarizing Layer)

The polarizing layer 4 has a function of extracting linearly polarized light having a polarizing surface in a predetermined direction from incident light (unpolarized natural light). Thus, incident light incident on eyes through the optical sheet 10 is polarized by removing diffused light.

The degree of polarization of the polarizing layer 4 is not particularly limited, but is preferably 50% or more and 100% or less, and more preferably 80% or more and 100% or less.

The polarizing layer 4 is a uniaxially stretched polymer film made of a resin material, thereby imparting the abovementioned function as the polarizing layer 4.

In addition, in the present invention, in this polarizing layer 4, the value of a* is 0 or more and 30 or less and the value of b* is 0 or more and 30 or less in the L*a*b* color system defined by JIS Z 8781-4, and in the optical sheet 10, the size of the Q Blue value defined by Australian Standard Australia/New Zealand Standard 1067-2016 is 0.70 or more. As described above, in the polarizing layer 4, the value of a* is 0 or more and 30 or less and the value of b* is 0 or more and 30 or less in the L*a*b* color system, which makes toning of the optical sheet 10 to brown possible. In addition, in the optical sheet 10, since the size of the Q Blue value is 0.70 or more, even in the optical sheet 10 toned to brown, blue light can be visually recognized with excellent distinguishability.

The polarizing layer 4 having such a constitution is not particularly limited, but for example, it is preferably one having a constitution in which a first light absorbing agent having a peak light absorbance in a wavelength range of 580 nm or more and 680 nm or less, a second light absorbing agent having a peak light absorbance in a wavelength range of 380 nm or more and 430 nm or less, and a third light absorbing agent having a peak light absorbance in a wavelength range of 430 nm or more and 580 nm or less are contained, and the polarizing layer 4 is dyed by adsorbing them on the resin material contained in the polarizing layer 4. In a case where the polarizing layer 4 is one containing the first light absorbing agent to the third light absorbing agent having the peak light absorbance in the wavelength range as described above, the optical sheet 10 that is relatively easily toned to brown can be obtained. That is, in the L*a*b* color system of the polarizing layer 4, it can be relatively easily satisfied that the value of a* is 0 or more and 30 or less, and the value of b* is 0 or more and 30 or less, preferably the value of a* is 2.0 or more and 14 or less, and the value of b* is 13 or more and 24 or less.

As described above, the first light absorbing agent has the peak light absorbance in the wavelength range of 580 nm or more and 680 nm or less, and specific examples thereof include blue dyes such as direct dyes, acid dyes, and basic dyes, and one or two or more kinds thereof can be used in combination.

In addition, the second light absorbing agent has the peak light absorbance in the wavelength range of 380 nm or more and 430 nm or less, and specific examples thereof include yellow dyes such as direct dyes, acid dyes, and basic dyes, and one or two or more kinds thereof can be used in combination.

The third light absorbing agent has the peak light absorbance in the wavelength range of 430 nm or more and 580 nm or less, and specific examples thereof include red dyes such as direct dyes, acid dyes, and basic dyes, and one or two or more kinds thereof can be used in combination.

Examples of the direct dyes include azo-based, phthalocyanine-based, and dioxazine-based dyes; examples of the acid dyes include azo-based, anthraquinone-based, triphenylmethane-based, phthalocyanine-based, oxygen anthracene-based, xanthene-based, indigoid-based, nitroso group-based, and pyrazolone-based dyes; and examples of the basic dyes include azo-based, triphenylmethane-based, azine-based, thiazine-based, and oxazine-based dyes, and among these, one is used as the first light absorbing agent to the third light absorbing agent depending on the location of the peak absorbance of itself.

Among these, each of the first light absorbing agent, the second light absorbing material, and the third light absorbing material is preferably an azo-based dye, and is particularly preferably an azo-based direct dye. Thus, dyeing of polyvinyl alcohol (PVA) can be efficiently performed in water, which makes it possible to reliably dye to brown which is a target color. That is, the optical sheet 10 can be reliably toned to brown.

Among such first light absorbing agent to third light absorbing material, the second light absorbing agent is particularly preferably at least one of a yellow dye represented by General Formula (1) (azo-based yellow dye) or a yellow dye represented by General Formula (2).

Where R¹'s each independently represent a hydrogen atom, a methyl group, or a sodium sulfonate group.

Where R²'s each independently represent a hydrogen atom, a methyl group, or a sodium sulfonate group.

Specific examples of the yellow dyes represented by General Formula (1) and General Formula (2) respectively include compounds represented by Formula (1A) and Formulas (2A) and (2B).

As shown in FIG. 4, when a transparent film, that is, the polarizing layer 4 is dyed using only the second light absorbing agent such that transmittance Tt of a peak top Pt is 30% and transmittance Th from 680 nm to 780 nm is 90% or more, for such a second light absorbing agent, an average light transmittance Ta obtained as an average value of transmittance measured in a wavelength range of 480 nm or more and 530 nm or less can be set to preferably 67% or more and 99% or less, more preferably 70% or more and 90% or less, and further preferably 70% or more and 87% or less. By using the second light absorbing agent having the above-mentioned characteristics, the blending amount of the light absorbing agent can be adjusted to an appropriate amount.

Therefore, the polarizing layer 4 can be one in which the light absorption spectrum shows a spectrum characteristic as shown in FIG. 3, that is, one having a first peak P1 having a peak wavelength of light transmittance in a wavelength range of 460 nm or more and 510 nm or less, in which transmittance T1 at the peak wavelength of this first peak P1 is preferably 5% or more and 40% or less, and more preferably 10% or more and 35% or less.

In FIGS. 3 and 4, the horizontal axis represents the wavelength (nm) and the vertical axis represents the transmittance (%), where FIG. 3 is a graph showing the light absorption spectrum of the polarizing layer 4, and FIG. 4 is a graph showing the light absorption spectrum of the second light absorbing agent. In addition, it is assumed that the transmittance on the vertical axis has a correlation with the light absorbance, and that the transmittance becomes small when the light absorbance becomes large, and the transmittance becomes large when the light absorbance becomes small.

From the above description, since the optical sheet 10 which has this polarizing layer 4 and in which the size of the Q Blue value defined by Australian Standard Australia/New Zealand Standard 1067-2016 is set to preferably 0.70 or more, more preferably 0.80 or more, and further preferably 0.9 or more is obtained, according to this optical sheet 10, even blue light can be visually recognized with excellent distinguishability. Therefore, when the sunglasses 100 are worn, the user can clearly recognize the contours and colors of objects and people, which makes it possible to increase safety at the time of wearing.

In addition, a half-width W1 of the transmittance at the first peak is preferably 20 nm or more and 60 nm or less, and more preferably 25 nm or more and 55 nm or less. Thus, in the optical sheet 10, the size of the Q Blue value can be more reliably set to 0.70 or more, and therefore, blue light can be visually recognized with excellent distinguishability through the optical sheet 10.

The half-width W1 at the first peak P1 is defined as follows. That is, a width of the first peak P1, which is obtained by taking a difference between a wavelength showing an average transmittance between a peak top of the first peak P1 and a bottom peak between 530 nm and 560 nm, and a wavelength showing an intermediate transmittance between a peak top of the first peak P1 and a bottom peak between 430 and 460 nm, is defined as the half-width W1 in the first peak P1.

The content of the first light absorbing agent to the third light absorbing agent in the polarizing layer 4 is preferably 0.0001 wt % or more and 0.1 wt % or less, and more preferably 0.001 wt % or more and 0.08 wt % or less. By adding each of the first light absorbing agent to the third light absorbing agent to the polarizing layer 4 in the content of such a range, it is reliably satisfied in the polarizing layer 4 that the value of a* is 0 or more and 30 or less and the value of b* is 0 or more and 30 or less, and it is reliably satisfied in the optical sheet 10 that the size of the Q Blue value is 0.70 or more.

In addition, examples of the resin material contained in the polarizing layer 4 include polyvinyl alcohol (PVA), partially formalized polyvinyl alcohol, polyethylene vinyl alcohol, polyvinyl butyral, polycarbonate, an ethylene-vinyl acetate copolymer partially saponified product, and the like, and one or two or more kinds thereof can be used in combination.

Among these resin materials, particularly, polyvinyl alcohol (PVA) is a material in which all of transparency, heat resistance, affinity for the first light absorbing agent to the third light absorbing agent, and orientation properties during stretching are excellent. Therefore, the polarizing layer 4 made of PVA as a main material has excellent heat resistance and an excellent polarizing function.

In addition, among the resin materials contained in the polarizing layer 4, polycarbonate is a material having excellent translucency, heat resistance, and strength. Therefore, the polarizing layer 4 made of polycarbonate as a main material has excellent strength.

The polycarbonate is not particularly limited, and various types can be used, but among them, aromatic polycarbonate is preferable. The aromatic polycarbonate has an aromatic ring in a main chain thereof, which makes it possible to make the strength of the optical sheet 10 more excellent.

In addition to the above-mentioned first light absorbing agent to third light absorbing agent and the resin material, the polarizing layer 4 further contains an additive such as an ultraviolet absorber that absorbs ultraviolet rays (light having a wavelength range of 100 nm or more and 420 nm or less).

The thickness of the polarizing layer 4 is not particularly limited, and is preferably 5 μm or more and 60 μm or less, and more preferably 10 μm or more and 40 μm or less. Thus, the function as the above-mentioned polarizing layer 4 can be reliably imparted to the polarizing layer 4.

(Protective Layer)

The protective layer 1 is located on the outermost side in a state where the optical sheet 10 is bonded to the spectacle lens 30, and has a function of protecting the layer on the inner side of the protective layer 1, that is, the polarizing layer 4.

The constituent material of the protective layer 1 is not particularly limited as long as it has a light-transmitting property, and examples thereof include various resin materials and various glass materials. The resin material is not particularly limited, and examples thereof include the same materials as the resin material of the polarizing layer 4 described above, but it is preferable that the resin material is the same type as the resin material of the polarizing layer 4.

In addition, the protective layer 1 is preferably stretched in one direction, and stretchability thereof is preferably 1% or more and 10% or less, and more preferably 2% or more and 8% or less. In addition, it is preferable that a stretching direction thereof coincides with a stretching direction of the polarizing layer 4. Thus, polarization characteristics of the optical sheet 10 as a whole can be enhanced.

In addition, the thickness of the protective layer 1 is not particularly limited, and is preferably 10 μm or more and 100 μm or less, and more preferably 30 μm or more and 60 μm or less, for example. Thus, the function as the protective layer 1 can be reliably imparted.

(Adhesive Layer)

The adhesive layer 15 has a function of bonding the polarizing layer 4 and the protective layer 1.

An adhesive (or a pressure sensitive adhesive) constituting the adhesive layer 15 is not particularly limited, and examples thereof include acrylic adhesives, urethane adhesives, epoxy adhesives, and silicone adhesives. Among these, urethane adhesives are preferable. Thus, transparency, adhesive strength, and durability of the adhesive layer 15 can be made more excellent, and followability to the shape change can be made particularly excellent.

The thickness of this adhesive layer 15 is not particularly limited, and is preferably 5 μm or more and 60 μm or less, and more preferably 10 μm or more and 40 μm or less, for example. Thus, the function as the adhesive layer 15 can be reliably imparted.

The total thickness of the optical sheet 10 as described above is preferably 0.1 mm or more and 2 mm or less.

The optical sheet 10 described above and the spectacle lenses 30 provided with such optical sheet 10 can be manufactured by applying a method for manufacturing an optical sheet and a method for manufacturing a spectacle lens provided with an optical sheet which are described below, for example. In the following description, a case in which an optical sheet is manufactured by an extrusion method will be described as an example.

<Method for Manufacturing Optical Sheet>

First, prior to the description of the method for manufacturing an optical sheet, an optical sheet manufacturing apparatus will be described.

Figure 5:
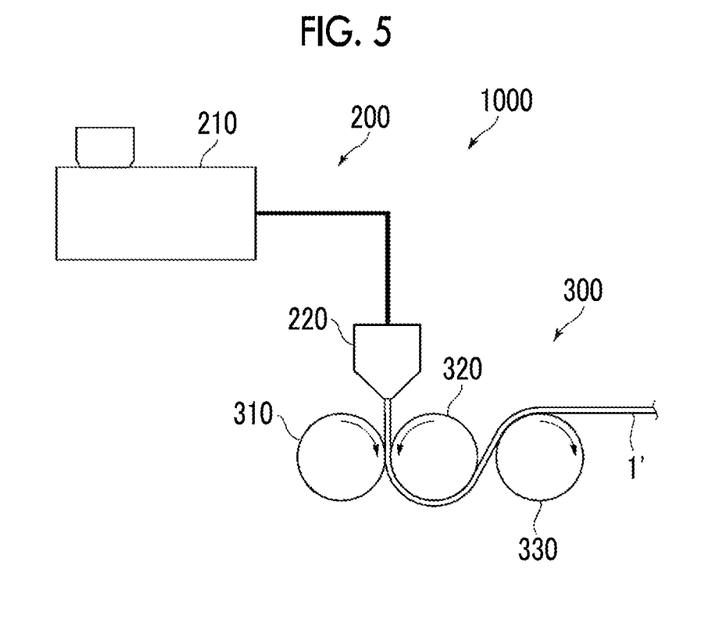
FIG. 5 is a side view schematically showing an optical sheet manufacturing apparatus for manufacturing the optical sheet shown in FIG. 2.

FIG. 5 is a side view schematically showing an optical sheet manufacturing apparatus for manufacturing the optical sheet shown in FIG. 2. In the following description, the upper side in FIG. 5 is referred to as "upper", and the lower side is referred to as "lower".

An optical sheet manufacturing apparatus 1000 shown in FIG. 5 has a sheet supply part 200 and a sheet molding part 300.

In the present embodiment, the sheet supply part 200 is constituted of an extruder 210, and a T-die 220 connected to a molten resin discharge part of the extruder 210 via a pipe. The T-die 220 supplies a band-shaped sheet 1' in a molten state or softened state to the sheet molding part 300.

The T-die 220 is an extrusion and molding part that extrudes the sheet 1' in the molten state or softened state into the state of the band-shaped sheet by an extrusion method. The constituent materials of each layer constituting the above-mentioned optical sheet 10 are sequentially loaded into the T-die 220 in a molten state, and this material in the molten state is extruded from the T-die 220 to continuously send out the band-shaped sheet 1'.

The sheet molding part 300 has a touch roll 310, a cooling roll 320, and a subsequent stage cooling roll 330. Each of these rolls is constituted to rotate independently by each of motors (driving means) which are not shown, and by the rotation of these rolls, cooling and continuous sending out are performed. By continuously feeding the sheet 1' to the sheet molding part 300, the surface of the sheet 1' is flattened, and the sheet 1' is set to a desired thickness and cooled. Then, by appropriately selecting the constituent materials of each layer constituting the optical sheet 10 which are to be loaded in the extruder 210 (T-die 220), the polarizing layer 4 or the protective layer 1 is obtained as the cooled sheet 1', and thereafter, this polarizing layer 4 and the protective layer 1 are bonded to each other via the adhesive layer 15 and then cut to a predetermined length to obtain the optical sheet 10.

The optical sheet 10 is manufactured by the method for manufacturing the optical sheet 10 using the optical sheet manufacturing apparatus 1000 as described above.

The method for manufacturing the optical sheet 10 using the optical sheet manufacturing apparatus 1000 includes an extrusion step, a molding step, a cooling step, a bonding step, and a cutting step.

<1A> First, the band-shaped sheet 1' in the molten state or softened state is extruded (extrusion step).

In this extrusion step, the extruder 210 is sequentially loaded with the constituent materials of each layer constituting the optical sheet 10. In addition, the constituent materials of each layer constituting the optical sheet 10 are in a molten or softened state in the extruder 210.

<2A> Next, the surface of the sheet 1' is flattened, and the sheet 1' is set to a predetermined thickness (molding step). The present step is performed between the touch roll 310 and the cooling roll 320.

<3A> Next, the surface of the sheet 1' is cooled (cooling step). The present step is performed between the cooling roll 320 and the subsequent stage cooling roll 330.

By appropriately selecting the constituent materials of each layer constituting the optical sheet 10 which are to be loaded in the extruder 210 and repeating the steps <1A> to <3A> as described above, each of the polarizing layer 4 and the protective layer 1 can be obtained.

<4A> Next, an adhesive for forming the adhesive layer 15 is applied on the polarizing layer 4, and in a state where the protective layer 1 is bonded on this adhesive, the adhesive is solidified to form the adhesive layer 15 (bonding step).

Thus, the polarizing layer 4 and the protective layer 1 are bonded to each other via the adhesive layer 15, and a laminate in which the polarizing layer 4, the adhesive layer 15, and the protective layer 1 are laminated in this order can be obtained.

<5A> Next, the obtained laminate is cut to a predetermined length (cutting step).

Thus, an optical sheet 10 having a constitution in which the polarizing layer 4 and the protective layer 1 are bonded via the adhesive layer 15 can be obtained.

By going through the above steps, the optical sheet 10 can be obtained. Next, the method for manufacturing a spectacle lens for manufacturing the spectacle lenses 30 provided with the optical sheet 10 will be described.

<Method for Manufacturing Spectacle Lens Provided with Optical Sheet>

First, prior to the description of the method for manufacturing a spectacle lens provided with an optical sheet, a spectacle lens manufacturing apparatus will be described.

Figure 6:
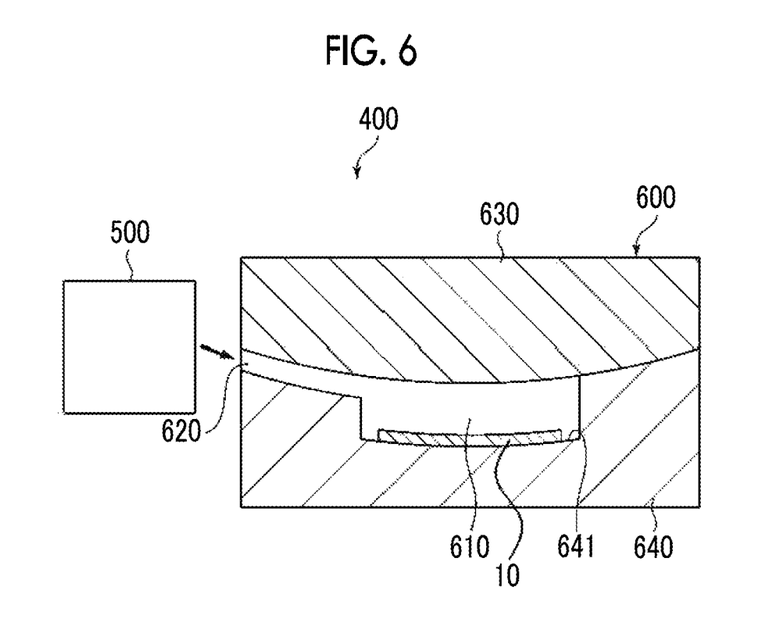
FIG. 6 is a cross-sectional view schematically showing a spectacle lens manufacturing apparatus for manufacturing a spectacle lens provided with the optical sheet.

FIG. 6 is a cross-sectional view schematically showing a spectacle lens manufacturing apparatus for manufacturing a spectacle lens provided with an optical sheet.

A spectacle lens manufacturing apparatus 400 shown in FIG. 6 has a resin supply part 500 and a mold 600. The resin supply part 500 is filled with the constituent material (lens material) of the above-mentioned spectacle lens 30. The mold 600 has a cavity 610, and a supply port 620 that communicates the inside and outside of the cavity 610. In addition, the mold 600 is constituted of an upper member 630 and a lower member 640, and in an assembled state in which these are assembled, the mold 600 that defines the spectacle lens manufacturing apparatus 400 is constituted.

The spectacle lens 30 provided with the optical sheet 10 is manufactured by the method for manufacturing a spectacle lens provided with an optical sheet using the spectacle lens manufacturing apparatus 400 as described above.

The method for manufacturing a spectacle lens provided with an optical sheet includes an optical sheet disposing step and a lens material supply step.

<1B> First, in a state where the upper member 630 and the lower member 640 are disassembled, the optical sheet 10 manufactured by the above-mentioned method for manufacturing an optical sheet is disposed on a bottom surface 641 of the lower member 640 so that the protective layer 1 is on the bottom surface 641 side (optical sheet disposing step). The bottom surface 641 has a curved concave surface, which makes it possible to form a curved surface on the spectacle lens 30. In addition, since the optical sheet 10 has flexibility, it is disposed according to the shape of the bottom surface 641.

<2B> Next, the upper member 630 and the lower member 640 are put into an assembled state, and a lens material in a molten or softened state is poured through the supply port 620 (lens material supply step). Then, by cooling the lens material in the molten or softened state, a laminate in which the optical sheet 10 and the spectacle lens 30 are laminated, that is, the spectacle lens 30 to which the optical sheet 10 is attached can be obtained.

In the above description, the so-called sheet insert method has been described as an example, but the spectacle lens 30 provided with the optical sheet 10 is not limited to this, and for example, a constitution in which the optical sheets 10 is laminated on the molded spectacle lens 30 via an adhesive layer may be used.

Although the preferred embodiments of the present invention have been described above, the present invention is not limited to the above-mentioned embodiments, and modifications, improvements, and the like within the range in which the object of the present invention can be achieved are included in the present invention.

For example, each part constituting the optical sheet of the present invention can be replaced with an arbitrary constitution capable of exhibiting the same function.

In addition, the optical sheet of the present invention may have any constituents added in addition to the above-mentioned constitutions.

More specifically, for example, the optical sheet of the present invention may include an intermediate layer, a frequency adjusting layer for adjusting frequency as a lens, and the like.

In addition, the intermediate layer, the frequency adjusting layer, and the protective layer described above may further contain various light absorbing agents.

In addition, the optical sheet of the present invention is not limited to the case of being attached to the spectacle lens described in the above embodiment, and can be used for an optical component provided by being attached to a curve shaped window member included in a brim portion provided in a sun visor, a vehicle such as an automobile, a motorcycle, and a railroad, an aircraft, a ship, a house, and the like, for example.

EXAMPLES

Hereinafter, the present invention will be described in more detail based on examples.

1. Preparation of Light Absorbing Agent (First Light Absorbing Agent)

As the first light absorbing agent, a blue dye represented by Formula (DB-85) was prepared.

(DB-85)

(Second Light Absorbing Agent)

As the second light absorbing agent, each of yellow dyes represented by Formula (1A), Formula (2A), Formula (3A), and Formula (4A) was prepared.

(1A)

-continued (2A)

(3A)

(4A)

(Third Light Absorbing Agent)

As the third light absorbing agent, a red dye represented by Formula (DR-81) was prepared.

(DR-81)

2. Creating Optical Sheet

Example 1

First, while stretching a polyvinyl alcohol film ("Kuraray Vinylon #7500" manufactured by Kuraray Co., Ltd.) in a water tank, the film was dyed with an aqueous solution in which substances described Tables 1-1 and 1-2 were dissolved as the first light absorbing agent to the third light absorbing agent, and thereafter subjected to immersion in a boric acid solution, further washed with water, and subjected to drying to obtain a polarizing layer 4.

When the dye was dissolved, each of the first light absorbing agent, the second light absorbing agent, and the third light absorbing agent was dissolved so that the blending amounts of the first light absorbing agent, the second light absorbing agent, and the third light absorbing agent were 0.57 parts by weight, 2.0 parts by weight, and 0.55 parts by weight, respectively, with respect to 100 parts by weight of polyvinyl alcohol after drying.

The thickness of the obtained polarizing layer 4 was 0.02 mm.

In addition, for the polarizing layer 4, the L*a*b* color system defined by JIS Z 8781-4 was measured using a spectrophotometer V-660 manufactured by JASCO Corporation. As a result, the value of L* was 38.8, the value of a* was 4.3, and the value of b* was 16.7.

In addition, the light absorption spectrum of the polarizing layer 4 was measured using the spectrophotometer V-660 device manufactured by JASCO Corporation, and when the transmittance T1 and the half-width W1 at the first peak P1 (peak wavelength) of the light transmittance recognized in the wavelength range of 460 nm or more and 510 nm or less were obtained, they were 15.1% and 30 nm, respectively.

[2] Next, 100 parts by weight of bisphenol A type polycarbonate ("IUPILON E2000FN E5100" manufactured by Mitsubishi Engineering-Plastics Corporation) was prepared as a protective layer forming material, and the protective layer forming material was stored in the extruder 210 of the optical sheet manufacturing apparatus 1000 as shown in FIG. 5, melted, and extruded and molded by the T-die 220 to obtain the protective layer 1. The thickness of the obtained protective layer 1 was 0.325 mm.

[3] Next, a coating film composed of Bond Ultra Versatile Clear (silylated urethane resin) manufactured by Konishi was applied so that the thickness of the adhesive layer 15 formed on one surface of the polarizing layer 4 after solidification was 20 μm. Then, the laminate in which the coating film was laminated on the polarizing layer 4, and the protective layer 1 were bonded to each other so that the coating film was interposed between the polarizing layer 4 and the protective layer 1, and thereafter, the adhesive layer 15 was formed by solidifying the coating film to obtain the optical sheet 10.

For the optical sheet 10, the size of a Q Blue value defined by Australian Standard Australia/New Zealand Standard 1067-2016 was measured using the spectrophotometer V-660 manufactured by JASCO Corporation. As a result, the size of the Q Blue value was 0.81.

Examples 2 to 9 and Comparative Examples 1 to 3

Optical sheets of Examples 2 to 9 and Comparative Examples 1 to 3 were obtained in the same manner as in Example 1 except that the types and contents of the first light absorbing agent to the third light absorbing agent used for forming the optical sheet 10 were changed as shown in Tables 1-1 and 1-2.

3. Evaluation of Optical Sheet

The optical sheets of each example and each comparative example were evaluated by the following methods.
(Blue Distinguishability Evaluation)
A photograph of a blue model was taken through the optical sheet manufactured as described above, and it was confirmed whether or not each of 10 people could distinguish the blue color.
A: 10 out of 10 people were able to distinguish.
B: 6 to 9 out of 10 people were able to distinguish.
C: 2 to 5 out of 10 people were able to distinguish.
D: 1 out of 10 people was able to distinguish.

The evaluation results of the optical sheets of each example and each comparative example obtained as described above are shown in Tables 1-1 and 1-2 below.

TABLE 1

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Polarizing layer 4 | Type of first light absorbing agent | Formula (DB-B5) | | | | | | | | | | | |
| | Content of first light absorbing agent [part by weight] | 0.57 | 0.4 | 0.29 | 0.57 | 0.45 | 0.3 | 0.6 | 0.47 | 0.31 | 0.5 | 0.4 | 0.27 |
| | Type of second light absorbing agent | Formula (1A) | | | Formula (2A) | | | Formula (3A) | | | Formula (4A) | | |
| | Content of second light absorbing agent [part by weight] | 2.0 | 1.4 | 1.2 | 2.0 | 1.5 | 1.3 | 1.1 | 1.0 | 1.0 | 1.2 | 1.3 | 1.0 |
| | Type of third light absorbing agent | Formula (DR-B1) | | | | | | | | | | | |
| | Content of third light absorbing agent [part by weight] | 0.55 | 0.55 | 0.39 | 0.6 | 0.5 | 0.4 | 0.5 | 0.4 | 0.3 | 0.1 | 0.1 | 0.1 |
| Light transmittance spectrum | Transmittance T1 [%] | 15.1 | 21.0 | 30.4 | 15.2 | 21.4 | 30.5 | 15.2 | 21.0 | 30.1 | 14.9 | 21.7 | 30.0 |
| | Half-width W1 [nm] | 30 | 35 | 35 | 50 | 50 | 50 | None | None | None | None | None | None |
| L'a'b' color system | L' (C_2) | 38.8 | 45.8 | 55.2 | 39.0 | 46.2 | 55.2 | 39.0 | 46.0 | 54.9 | 38.6 | 46.6 | 54.8 |
| | a' (C_2) | 4.3 | 8.2 | 4.9 | 3.6 | 3.6 | 2.9 | 6.2 | 5.0 | 3.7 | 6.9 | 4.7 | 13.1 |
| | b' (C_2) | 16.7 | 16.4 | 18.3 | 13.5 | 13.6 | 16.3 | 14.6 | 17.0 | 22.2 | 18.5 | 20.7 | 22.5 |
| Australian standard | Q_Blue (>0.7) | 0.81 | 0.81 | 0.83 | 0.94 | 0.94 | 0.92 | 0.76 | 0.77 | 0.74 | 0.63 | 0.66 | 0.66 |
| Evaluation | Blue distinguishability | B | B | A | A | A | A | C | C | C | D | D | D |

As shown in Tables 1-1 and 1-2, in the optical sheet toned to brown in each example, it was satisfied that the size of the Q Blue value was 0.70 or more, which made it possible to visually recognize with excellent distinguishability even when light was blue.

On the other hand, in the optical sheet toned to brown in each comparative example, it was not satisfied that the size of the Q Blue value was 0.70 or more, and due to this, the result in which blue light could not be distinguished was shown.

INDUSTRIAL APPLICABILITY

An optical sheet of the present invention includes a laminate including a polarizing layer containing at least one kind of a light absorbing agent and having a polarizing function, and a protective layer laminated on the polarizing layer, in which in the polarizing layer, a value of a* is 0 or more and 30 or less and a value of b* is 0 or more and 30 or less in an L*a*b* color system defined by JIS Z 8781-4, and in which in the optical sheet, a size of a Q Blue value defined by Australian Standard Australia/New Zealand Standard 1067-2016 is 0.70 or more.

As described above, in the polarizing layer, the value of a* is 0 or more and 30 or less and the value of b* is 0 or more and 30 or less in the L*a*b* color system. Therefore, the optical sheet can be an optical sheet toned to brown. In addition, such an optical sheet of the present invention, a size of a Q Blue value defined by Australian Standard Australia/New Zealand Standard 1067-2016 is 0.70 or more. Accordingly, even when the optical sheet is toned to brown, blue light can be visually recognized with excellent distinguishability. Accordingly, the present invention has industrial applicability.

The invention claimed is:

1. An optical sheet comprising:
a laminate including a polarizing layer containing at least one kind of a light absorbing agent and having a polarizing function, and a protective layer laminated on the polarizing layer,
wherein in the polarizing layer, a value of a* is 0 or more and 14 or less and a value of b* is 13.5 or more and 30 or less in an L*a*b* color system defined by JIS Z 8781-4, and
wherein in the optical sheet, a size of a Q Blue value defined by Australian Standard Australia/New Zealand Standard 1067-2016 is 0.70 or more.

2. The optical sheet according to claim 1,
wherein the polarizing layer has a first peak having a peak wavelength of light transmittance in a wavelength range of 460 nm or more and 510 nm or less in a light absorption spectrum, and
wherein the light transmittance at the peak wavelength of the first peak is 5% or more and 40% or less.

3. The optical sheet according to claim 2,
wherein a half-width of the transmittance at the first peak is 20 nm or more and 60 nm or less.

4. The optical sheet according to claim 1,
wherein the light absorbing agent includes a first light absorbing agent having a peak light absorbance in a wavelength range of 580 nm or more and 680 nm or less, a second light absorbing agent having a peak light absorbance in a wavelength range of 380 nm or more and 430 nm or less, and a third light absorbing agent having a peak light absorbance in a wavelength range of 430 nm or more and 580 nm or less, and
wherein when a transparent film is dyed with the second light absorbing agent such that transmittance of a peak top is 30% and transmittance from 680 nm to 780 nm is 90% or more, the second light absorbing agent has a light absorption spectrum in which an average light transmittance obtained as an average value of transmittance measured in a wavelength range of 480 nm or more and 530 nm or less is 67% or more and 99% or less.

5. The optical sheet according to claim 4,
wherein each of the first light absorbing agent, the second light absorbing agent, and the third light absorbing agent is an azo-based dye.

6. The optical sheet according to claim 4,
wherein the second light absorbing agent is at least one of yellow dyes represented by General Formula (1) and General Formula (2), where R$^1$'s each independently represent a hydrogen atom, a methyl group, or a sodium sulfonate group, and where R$^2$'s each independently represent a hydrogen atom, a methyl group, or a sodium sulfonate group.

7. An optical component comprising:
a substrate; and
the optical sheet according to claim 1 which is laminated on the substrate.

* * * * *